(12) United States Patent
Steedly

(10) Patent No.: US 9,055,650 B2
(45) Date of Patent: Jun. 9, 2015

(54) ENERGY SAVING DIMMER FOR LED LUMINAIRE DRIVER

(71) Applicant: MAXLITE, INC., West Caldwell, NJ (US)

(72) Inventor: James Steedly, Menifee, CA (US)

(73) Assignee: MaxLite, Inc., West Caldwell, NJ (US)

( * ) Notice: Subject to any disclaimer, the term of this patent is extended or adjusted under 35 U.S.C. 154(b) by 0 days.

(21) Appl. No.: 14/255,552

(22) Filed: Apr. 17, 2014

(65) Prior Publication Data
US 2014/0312775 A1    Oct. 23, 2014

Related U.S. Application Data

(60) Provisional application No. 61/812,889, filed on Apr. 17, 2013.

(51) Int. Cl.
*H05B 37/00* (2006.01)
*H05B 33/08* (2006.01)

(52) U.S. Cl.
CPC .......... *H05B 33/089* (2013.01); *H05B 33/0845* (2013.01)

(58) Field of Classification Search
CPC .................. H05B 41/2855; H05B 41/2851
USPC ......... 315/125, 127, 291, 294, 297, 306–307, 315/310
See application file for complete search history.

(56) References Cited

U.S. PATENT DOCUMENTS

| | | | |
|---|---|---|---|
| 2008/0111501 A1* | 5/2008 | Dobbins et al. | 315/294 |
| 2013/0093353 A1* | 4/2013 | Park et al. | 315/291 |
| 2014/0203712 A1* | 7/2014 | Lin | 315/152 |
| 2014/0277805 A1* | 9/2014 | Browne et al. | 700/295 |
| 2014/0312776 A1* | 10/2014 | Park et al. | 315/129 |

* cited by examiner

*Primary Examiner* — Jason M Crawford
(74) *Attorney, Agent, or Firm* — Hoffmann & Baron, LLP

(57) ABSTRACT

A dimming control and driver for an LED luminaire comprises a shutdown relay connected between an AC source and the driver circuit. The shutdown relay will close above a predetermined control voltage, and will open below the predetermined voltage. The shutdown relay will eliminate parasitic loss by turning the power completely off when the LED luminaire is turned off.

16 Claims, 2 Drawing Sheets

ENERGY SAVING DIMMER FOR LED LUMINAIRE DRIVER

CROSS-REFERENCE TO RELATED APPLICATION

This application claims priority to U.S. Provisional Application No. 61/812,889, filed Apr. 17, 2013, the entire contents of which are incorporated by reference herein.

FIELD OF THE INVENTION

This invention relates to LED luminaires and, more particularly, to a dimming control and driver for an LED luminaire.

BACKGROUND OF THE INVENTION

LED (light emitting diode) luminaires are coming into common use in commercial, institutional, and residential buildings. Some are designed with the look of a traditional fluorescent fixture, having a recessed Troffer housing. Some are screw thread based, to replace incandescent bulbs. All operate with the energy saving and long life benefits of LED technology. The recessed Troffer is available in standard 1'×4', 2'×2' and 2'×4' sizes. LED luminaires are offered in correlated color temperatures (CCT), for example, of 3500 K (warm light), 4100 K (cool white), and 5000 K (daylight).

Dimming controls are available for LED luminaires. The dimmer allows control of light intensity with a simple rotating knob. A problem with currently available "simple" dimmers is that the driver circuit will exhibit parasitic power flow even when the dimmer is turned down fully. The parasitic load is typically more than ½ watt. This continuous wasted power will preclude the simple dimmer from qualifying for Energy Star certification. Products that carry the Energy Star symbol are approved by the Environmental Protection Agency (EPA). These products meet energy efficiency requirements and standards related to energy savings, reduced utility costs, lower energy consumption and reduced greenhouse gas emissions. The federal government offers federal tax credits for certain Energy Star products. Some states offer tax credits, as well.

There is a need, therefore, for a dimming control for LED luminaires that will reduce or eliminate parasitic losses.

There is a further need for a dimming control for LED luminaires as described, and that can be installed quickly and easily.

There is a still further need for a dimming control for LED luminaires as described, and that can be manufactured in large quantities of high quality, and in a cost-effective manner.

SUMMARY

An LED luminaire with dimmer control 110 is used in connection with an LED luminaire 112, as shown in FIG. 2. The luminaire 112 has an LED 114, a current control circuit 116 supplying electrical power to the LED 114, a driver circuit 118 supplying electrical power to the current control circuit 116, and an AC source 120 supplying electrical power to the driver circuit 118. The AC source is 120 v or 240 v. An input signal source 126 of between zero and ten volts is connected to the dimmer 124.

The dimmer control 122 comprises a shutdown relay 128 operatively connected between the AC source 120 and the driver circuit 118. The shutdown relay 128 will close at or above a predetermined control voltage. Conversely, the shutdown relay 128 will open at or below the predetermined voltage. A dimmer 124 is adapted to supply a control voltage selectively to the shutdown relay 128 and to the current control circuit 116.

As the control voltage increases above the predetermined voltage, the shutdown relay 128 will allow power to flow to the driver circuit 118. As the control voltage decreases below the predetermined voltage, the shutdown relay 128 will cut off power flow to the driver circuit 118, thereby eliminating parasitic loss. The instant invention therefore solves the problem of parasitic loss by turning the power completely off when the LED luminaire is turned off.

DETAILED DESCRIPTION OF THE INVENTION

Figure 1:
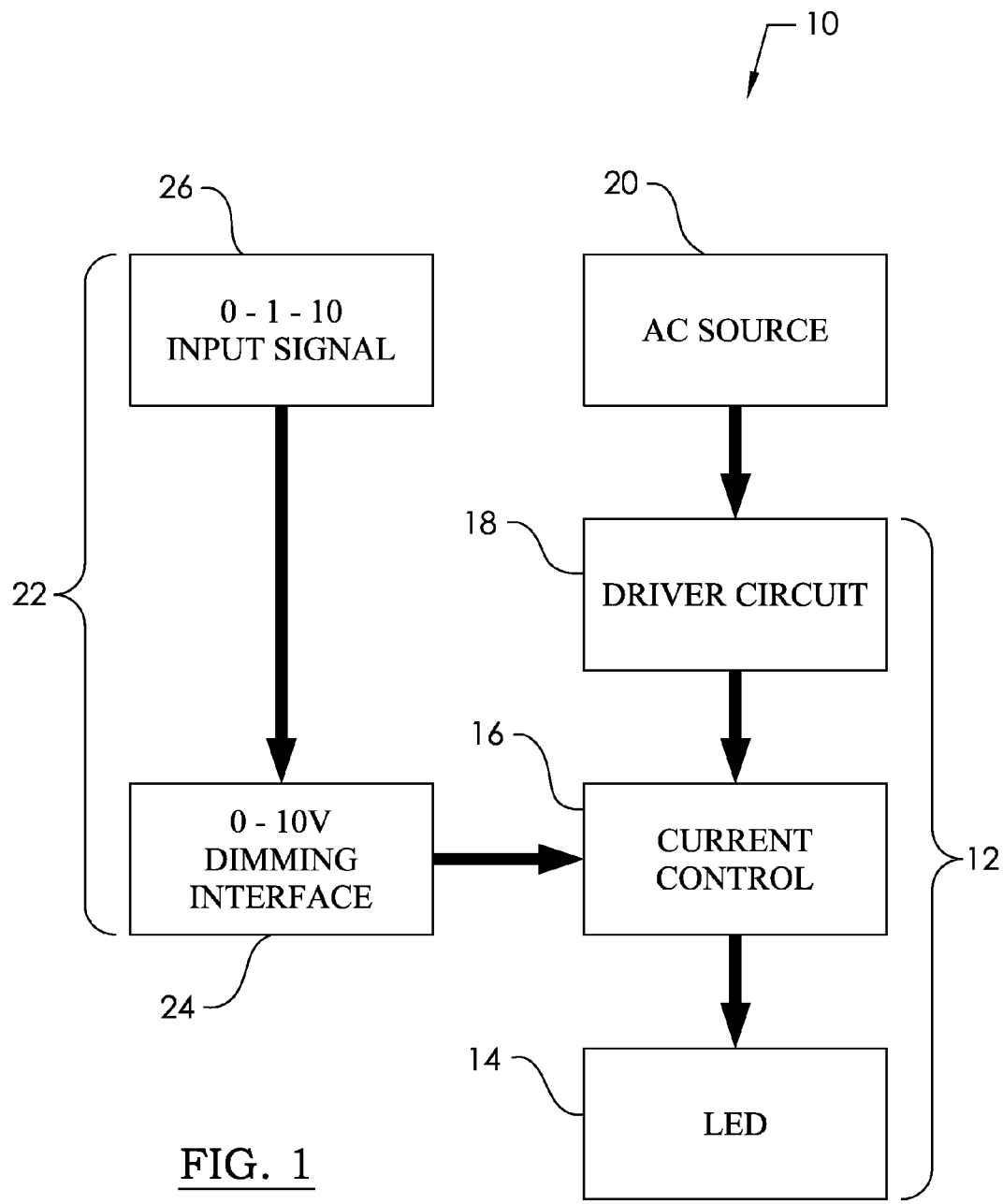
FIG. 1 is a flow chart of a prior art dimmer for an LED luminaire.

Referring to FIG. 1, a prior art LED luminaire with dimmer control is shown at 10. The dimmer control 22 is used in connection with an LED luminaire 12. The luminaire has an LED 14, a current control circuit 16 supplying electrical power to the LED 14, and a driver circuit 18 supplying electrical power to the current control circuit 16. An AC source 20 supplies electrical power to the driver circuit 18. The AC source electrical power is typically 120 v or 240 v, but any power source can be used. The dimmer control 22 includes a dimming interface, or dimmer 24 and an input signal source 26 connected to the dimmer 24 for supplying an input voltage. In this example, the input voltage is 10 vdc, but can be any voltage. The dimmer 24 typically includes a potentiometer, and may also include related circuitry. The dimmer 24 is operatively connected to the current control circuit 16, and supplies a control voltage. By varying the control voltage, the current to the LED 14 varies, and the luminous output of the LED 14 thereby varies. This is known by those skilled in the art as "simple dimming." One serious shortcoming is that as the control voltage drops below a certain low value, or even to zero, the current is not completely shut off. A parasitic load of ½ watt or more is constantly running. This parasitic load precludes qualifying for Energy Star rating.

Figure 2:
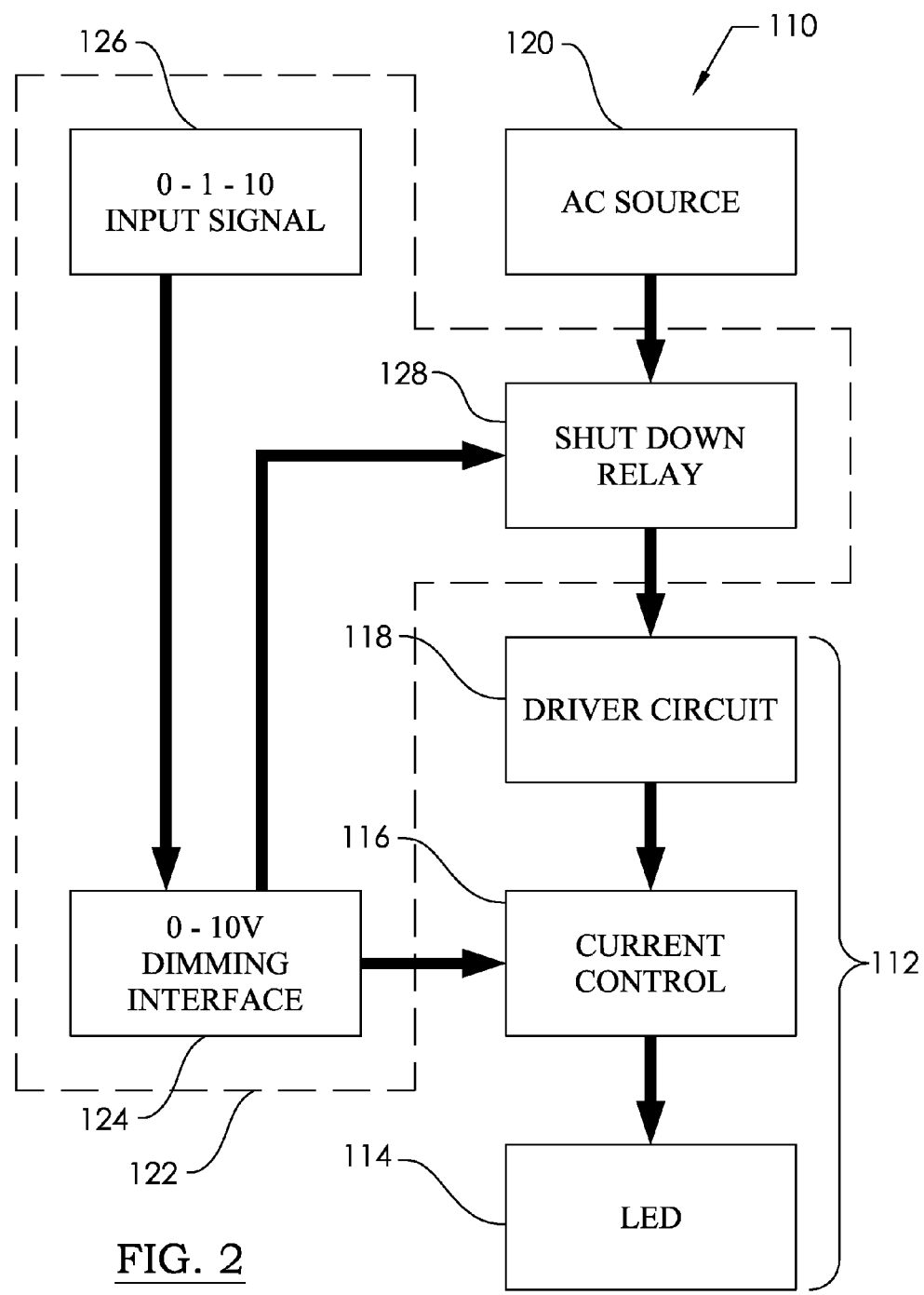
FIG. 2 is a flow chart of a dimmer for an LED luminaire driver constructed in accordance with the invention.

Turning now to FIG. 2, an LED luminaire with dimmer control 110 is used in connection with an LED luminaire 112. The luminaire 112 has an LED 114, a current control circuit 116 supplying electrical power to the LED 114, a driver circuit 118 supplying electrical power to the current control circuit 116, and an AC source 120 supplying electrical power to the driver circuit 118. The AC source electrical power is typically 120 v or 240 v, as above. It is to be understood that any power source, such as AC of any voltage or frequency or phase, and DC of any voltage can be used. The input signal source usually will vary between zero and approximately ten volts. It is to be understood that the input signal source can be any voltage.

The dimmer control 122 comprises a shutdown relay 128 operatively connected between the AC source 120 and the driver circuit 118. The shutdown relay 128 is responsive to a control voltage. The shutdown relay 128 will close at or above a predetermined voltage. Conversely, the shutdown relay 128 will open at or below the predetermined voltage. The predetermined voltage will be set at the factory to a low value, at or near zero. A dimmer 124 is operatively connected to the shutdown relay 128 and to the current control circuit 116. The dimmer 124 is adapted to supply the control voltage selectively to the shutdown relay 128 and to the current control circuit 116. An input signal source 126 is connected to the dimmer 124 for supplying an input voltage.

As the control voltage increases above the predetermined voltage, the shutdown relay 128 will allow power to flow to the driver circuit 118. As the control voltage decreases below the predetermined voltage, the shutdown relay 128 will cut off power flow to the driver circuit 118, thereby eliminating parasitic loss. The instant invention therefore solves the problem of parasitic loss by turning the power completely off when the LED luminaire is turned off.

The control voltage is varied selectively by turning a control knob (not shown) on the dimmer 124. In response, the current through the current control circuit 116 will vary directly as the control voltage is varied selectively from the predetermined voltage to a maximum voltage. In further response to the control voltage, the luminous output of the LED 114 will vary directly as the control voltage is varied selectively from approximately the predetermined voltage to a maximum voltage.

The current through the current control circuit 116 is zero as the control voltage is varied selectively from approximately the predetermined voltage downward to a minimum voltage. Thus, the luminous output of the LED will be zero as the control voltage is varied selectively from approximately the predetermined voltage to a minimum voltage.

A method is disclosed for dimming an LED luminaire. The luminaire is as described above. The method comprises first connecting a shutdown relay 128 operatively between the AC source 120 and the driver circuit 118, then connecting a dimmer 124 operatively to the shutdown relay 128 and to the current control circuit 116. Next, supplying a control voltage selectively from the dimmer 124 to the shutdown relay 128, and supplying the control voltage selectively from the dimmer 124 to the current control circuit 116, then supplying an input voltage from an input signal source 126 to the dimmer 124. Next, allowing power to flow through the shutdown relay 128 to the driver circuit 118 as the control voltage increases above a predetermined voltage. Lastly, stopping power flow through the shutdown relay 128 to the driver circuit 118 as the control voltage decreases below the predetermined voltage.

The method further comprises the steps of increasing the control voltage above the predetermined voltage so as to allow power to flow through the shutdown relay 128 to the driver circuit 118, then directly varying the current through the current control circuit 116 by selectively varying the control voltage from approximately the predetermined voltage to a maximum voltage, then directly varying the luminous output of the LED 114 by selectively varying the control voltage from approximately the predetermined voltage to a maximum voltage.

The method still further comprises the steps of decreasing the control voltage below the predetermined voltage so as to cut off power flow from the shutdown relay 128 to the driver circuit 118, thereby eliminating parasitic losses by cutting off power flow from the shutdown relay 128 to the driver circuit 118. Next, stopping the current through the current control circuit 116 by selectively varying the control voltage from approximately the predetermined voltage to a minimum voltage. The next step is stopping the luminous output of the LED 114 by selectively varying the control voltage from approximately the predetermined voltage to a minimum voltage. A final step is varying the input signal source 126 between zero and approximately ten volts.

What is claimed is:

1. A dimmer control for use in connection with an LED luminaire, the luminaire having an LED, a current control circuit supplying power to the LED, a driver circuit supplying power to the current control circuit, and an AC source supplying power to the driver circuit, the dimmer control comprising:
   a shutdown relay operatively connected between the AC source and the driver circuit, the shutdown relay being responsive to a control voltage;
   a dimmer operatively connected to the shutdown relay and to the current control circuit, the dimmer being adapted to supply the control voltage selectively to the shutdown relay and to the current control circuit; and
   an input signal source connected to the dimmer for supplying an input voltage.

2. The dimmer control of claim 1, wherein as the control voltage increases above a predetermined voltage, the shutdown relay will allow power to flow to the driver circuit.

3. The dimmer control of claim 2, wherein the current through the current control circuit varies directly as the control voltage is varied selectively from approximately the predetermined voltage to a maximum voltage.

4. The dimmer control of claim 3, wherein the luminous output of the LED varies directly as the control voltage is varied selectively from approximately the predetermined voltage to a maximum voltage.

5. The dimmer control of claim 1, wherein as the control voltage decreases below a predetermined voltage, the shutdown relay will cut off power flow to the driver circuit, thereby eliminating parasitic losses.

6. The dimmer control of claim 5, wherein the current through the current control circuit is zero as the control voltage is varied selectively from approximately the predetermined voltage to a minimum voltage.

7. The dimmer control of claim 6, wherein the luminous output of the LED is zero as the control voltage is varied selectively from approximately the predetermined voltage to a minimum voltage.

8. The dimmer control of claim 1, wherein the input signal source varies between zero and approximately ten volts.

9. A method of dimming an LED luminaire, the luminaire having an LED, a current control circuit supplying power to the LED, a driver circuit supplying power to the current control circuit, and an AC source supplying power to the driver circuit, the method comprising:
   connecting a shutdown relay operatively between the AC source and the driver circuit;
   connecting a dimmer operatively to the shutdown relay and to the current control circuit;
   supplying a control voltage selectively from the dimmer to the shutdown relay;
   supplying the control voltage selectively from the dimmer to the current control circuit;
   supplying an input voltage from an input signal source to the dimmer;
   allowing power to flow through the shutdown relay to the driver circuit as the control voltage increases above a predetermined voltage; and
   stopping power flow through the shutdown relay to the driver circuit as the control voltage decreases below the predetermined voltage.

10. The method of claim 9, further comprising increasing the control voltage above the predetermined voltage so as to allow power to flow through the shutdown relay to the driver circuit.

11. The method of claim 10, further comprising directly varying the current through the current control circuit by selectively varying the control voltage from approximately the predetermined voltage to a maximum voltage.

12. The method of claim 11, further comprising directly varying the luminous output of the LED by selectively varying the control voltage from approximately the predetermined voltage to a maximum voltage.

13. The method of claim 12, further comprising:
decreasing the control voltage below the predetermined voltage so as to cut off power flow from the shutdown relay to the driver circuit; and
eliminating parasitic losses by cutting off power flow from the shutdown relay to the driver circuit.

14. The method of claim 13, further comprising stopping the current through the current control circuit by selectively varying the control voltage from approximately the predetermined voltage to a minimum voltage.

15. The method of claim 14, further comprising stopping the luminous output of the LED by selectively varying the control voltage from approximately the predetermined voltage to a minimum voltage.

16. The method of claim 9, further comprising varying the input signal source between zero and approximately ten volts.

* * * * *